United States Patent [19]

Nelms et al.

[11] 4,150,096

[45] Apr. 17, 1979

[54] PROCESS FOR TREATING COMBUSTION GASES

[76] Inventors: William M. Nelms, 8432 E. Lincoln Dr., Scottsdale, Ariz. 85253; Charles F. Turton, 1748 E. Ocotillo, Phoenix, Ariz. 85106

[21] Appl. No.: 846,672

[22] Filed: Oct. 31, 1977

[51] Int. Cl.$^2$ ............................................. C01B 17/00
[52] U.S. Cl. ..................................... 423/242; 423/166
[58] Field of Search ...................... 423/242, 244, 166

[56] References Cited

U.S. PATENT DOCUMENTS

| | | | |
|---|---|---|---|
| 3,904,742 | 9/1975 | Akimoto | 423/242 |
| 3,911,084 | 10/1975 | Wall et al. | 423/242 |
| 3,919,394 | 11/1975 | Selmeczi | 423/242 |
| 3,980,756 | 9/1976 | Dixson et al. | 423/166 |
| 4,002,724 | 1/1977 | McKie | 423/242 |

FOREIGN PATENT DOCUMENTS 396969   8/1933   United Kingdom ..................... 423/242

*Primary Examiner*—O. R. Vertiz
*Assistant Examiner*—G. A. Heller
*Attorney, Agent, or Firm*—Drummond and Nelson

[57] ABSTRACT

A process for removal of particulate material and sulfur dioxide from a gas stream by washing the gas stream in a treatment zone in a wet scrubber by injection of a reactant such as high calcium or magnesium lime to control pH in the range of 6.0 to 8.5. A resultant slurry containing calcium sulfate, calcium sulfite and solids is formed in the scrubber and a controlled quantity of the solids containing slurry is recycled to the scrubber washing zone as part of the washing fluid to aid in co-precipitation by providing nucleation sites for the calcium sulfate and sulfite crystals maintaining an unsaturated calcium sulfate level in the slurry.

8 Claims, 6 Drawing Figures

ELECTRON MICROGRAPH OF
FLY ASH SLUDGE SOLIDS
FROM SCRUBBER
(MAGNIFIED 10,000X)

PROCESS FOR TREATING COMBUSTION GASES

The present invention relates to the treatment of combustion gases and more particularly to an improved process for the removal of sulfur dioxide and particulate material from such gases.

The combustion of various fossil fuels such as oil and coal, produce products of combustion which include, among others, sulfur dioxide and flyash. Sulfur dioxide poses a particularly serious pollution problem and stringent regulation of sulfur dioxide emissions has been enacted by federal, state and local governmental agencies. Utility and power generating companies, which are substantial users of fossil fuels, are subject to this regulation and must employ methods of purifying the resulting combustion gases to reduce emissions of sulfur dioxide and particulate material. One approach has been to improve the quality of the fuel by reducing the sulfur content prior to combustion.

A number of systems have been developed for treating combustion gases to at least partially remove sulfur dioxide and other objectional constituents from the stack gases. One common method of treating stack gases to remove objectionable contaminants is to subject the stack gas to wet scrubbing effecting absorption of the sulfur dioxide in water. In order to improve the effectiveness of such scrubbing systems, it is also known to use aqueous slurries of lime containing material such as calcium carbonate, dolomite, quicklime and the like to react with the sulfur dioxide to form calcium sulfate and calcium sulfite.

Calcium sulfite and calcium sulfate formed in these chemical reactions often form supersaturated solutions from which they precipitate to scale and adhere as solid deposits on exposed plant surfaces and these deposits can cause serious obstructions particularly in pipes. Accordingly, much work has been done to eliminate the scaling or adhesion problem attendant to addition of lime and wet scrubbers.

U.S. Pat. No. 2,080,779 suggests that the scaling problem can be solved by periodically washing or flushing the exposed plant surfaces with a flow of liquids substantially free of calcium sulfates.

Later developments take other approaches to the problem. U.S. Pat. No. 3,972,980 suggests introducing seed crystals of the sulfites or sulfates into the scrubbing medium. The seed crystals being in selected number and size to control the level of supersaturation of the scrubbing medium with respect to the sulfites and or sulfates.

U.S. Pat. No. 3,919,393 describes an improved process for removal of sulfur dioxide from the combustion of sulfur containing fuels in wet scrubbers. In this process, an aqueous solution of calcium oxide containing 2-10% magnesium oxide is added to the scrubber to reduce scaling.

The present invention deals with a process involving direct injection of a lime containing reactant into a single state scrubber without the necessity of reaction mix tanks, elaborate wash systems, or addition of other chemicals. The lime injection is carried out in such a way that formation of crystals such as calcium sulfite, calcium sulfate and dissolved sulfites is controlled to minimize the deposit of these materials on exposed scrubber and plant surfaces. Briefly, it has been found that flyash solids in the slurry from the scrubber aid in the precipitation of calcium sulfite and calcium sulfate crystals by providing heterogeneous nucleation sites for the formation of these crystals. The process of the present invention maintains a high proportion of flyash solids in the recycle stream generally in the range of 5 to 25%. A reactant such as high calcium lime or magnesium lime is directly injected into the scrubber to maintain scrubber slurry at a pH of approximately 6.0 to 8.5 resulting in subsaturated levels of calcium sulfate in the slurry. The slurry, containing flyash and sulfur compounds, is continuously removed from the scrubber circuit and a controlled quantity is recycled or returned to the scrubber washing zone as part of the washing fluid. Scrubbed clean combustion gases are discharged from the scrubber through the stack and into the atmosphere. A quantity of slurry is removed from the recycle and is introduced into a thickener to maintain the solid content of the recycle at approximately 5 to 25% by weight. The removed slurry may be subjected to thickening and the settled solids pumped to a disposal area.

The above and other objects and advantages of the present invention will become more readily apparent from the following description, claims and drawings in which:

Figure 4:
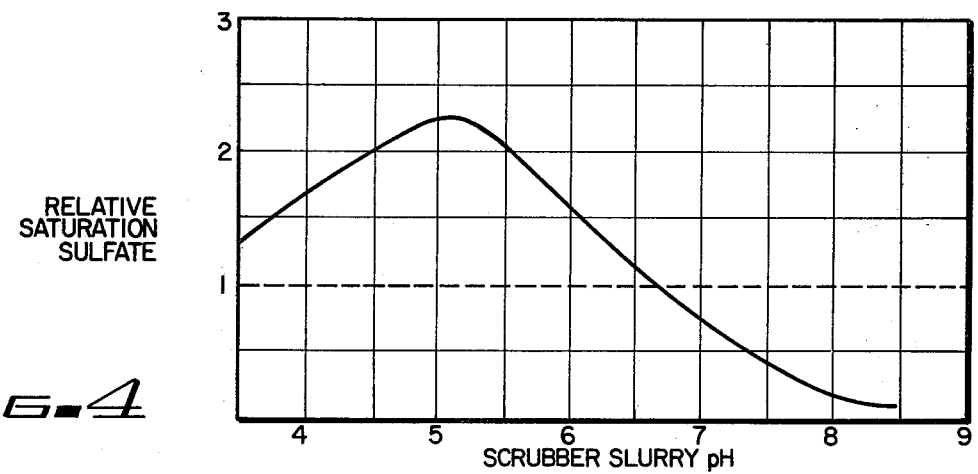
Figure 5:
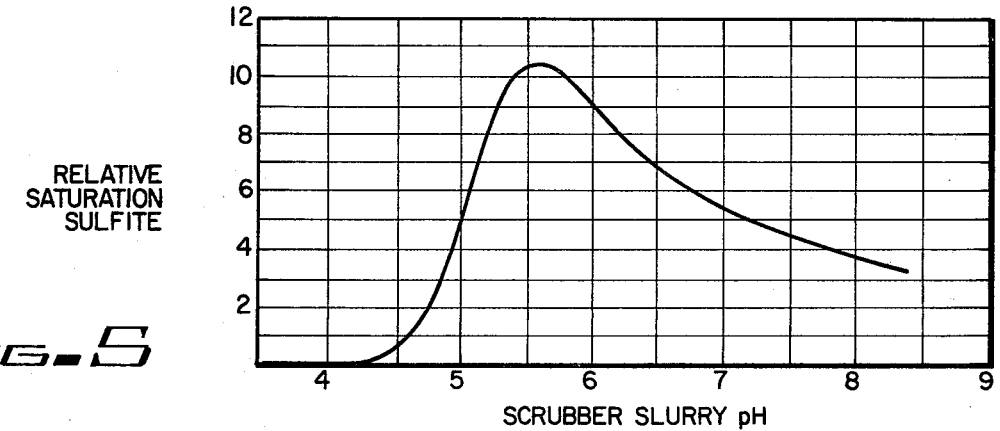
Figure 6:

FIG. 4 graphically illustrates the relative saturation of calcium sulfite versus pH with high calcium lime;

FIG. 5 is a graph illustrating the relative saturation of calcium sulfate versus pH with high calcium lime; and FIG. 6 is an electron micrograph showing the formation of calcium sulfate and calcium sulfite crystals on flyash surfaces.

Figure 1:
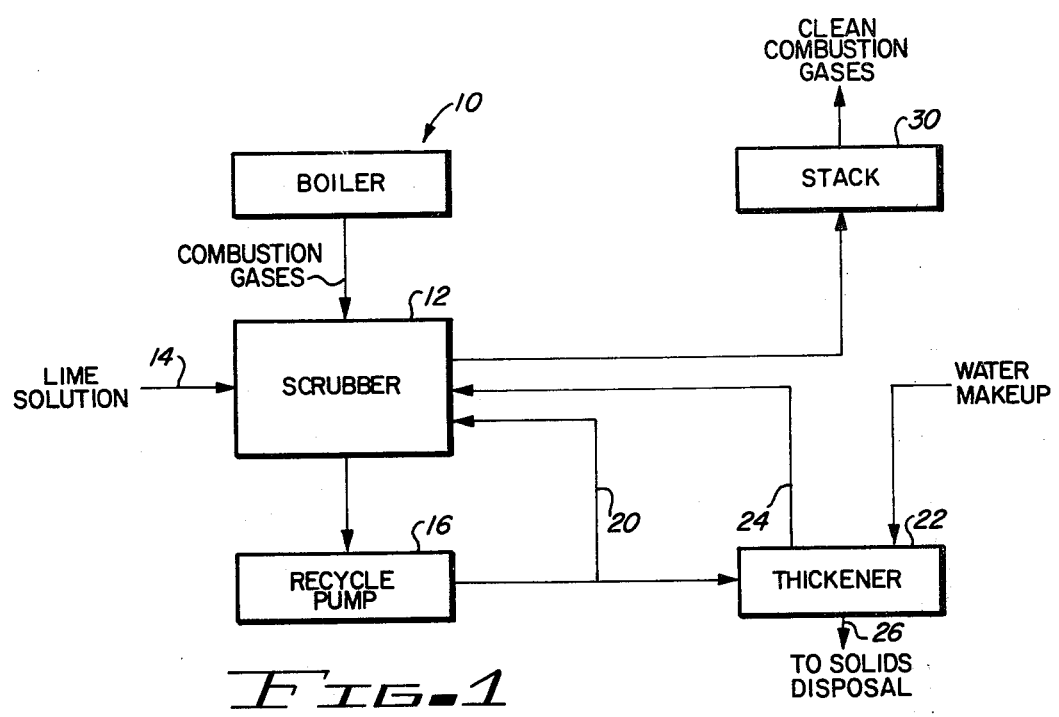
FIG. 1 is a block flow diagram illustrating the process of the present invention.

Turning now to the drawings, FIG. 1 basically illustrates the process according to the present invention. Combustion gases are generated from boiler 10 as a result of the combustion of fossil fuel. The combustion gases are introduced into scrubber 12 in which a subsaturated level of calcium sulfate and sulfites are maintained. Injection of aqueous lime occurs at 14 directly into the scrubber circuit to maintain liquid slurry in the scrubber at a near neutral condition. Slurry from the scrubber is withdrawn by recycle pump 16 and a controlled quantity of slurry is reintroduced into the scrubber washing zone as part of the washing fluid via recycle line 20. A quantity of discharge slurry is removed to thickener 22 from which clear water is returned to the scrubber via line 24. Solids are pumped through line 26 to a disposal area. Stack gases, which are substantially cleaned of sulfur and flyash, are removed at stack 30. The foregoing description briefly describes the present invention. A more complete understanding of the present invention will be had with reference to FIG. 2 which schematically illustrates the process of the present invention.

A boiler produces a gas stream from combustion of a fossil fuel such as coal and the gaseous products are introduced into the scrubber 12 at central stack 32. The products of combustion vary somewhat with the type of fuel but generally the products occuring from the complete combustion of fossil fuels are $CO_2$, $H_2O$ and, if sulfur is present as it is in many fuels, $SO_2$. Accompanying these are nitrogen and oxygen. In addition, flyash is often produced, principally comprising the oxides of silica, alumina, iron and lime, as well as other trace materials.

The scrubber 12 can be of any vertical or horizontal type. For purposes of illustration, the scrubber is illustrated as the type of vertical scrubber manufactured by the Chemical Construction Company (CHEMICO) which includes a centrally located, conical baffle 34 sometimes termed a "plumb bob" located adjacent venturi section 33. The baffle 34 is adjustable to control the pressure drop across the venturi 33. The incoming gas stream is directed down onto the apex of the baffle in a washing zone 41. Typically, the incoming gas stream from a boiler has a temperature of approximately 340° F.

A reactant such as high calcium lime or high magnesium lime is introduced into the washing zone of scrubber 12 by injection at nozzle 35 at a location below the conical flow diversion baffle 34 at the discharge of the venturi section 33. The reactant is mixed with the incoming gas stream. A generally horizontal annular mist separater 38 is positioned within scrubber 12 to separate and entrain moisture from the scrubbed gas phase. The scrubbed gas is removed via conduit 40 above the mist separator under the influence of induction fan 42. Induction fan 42 discharges into entrainment unit 44 having one or more elements 46 for entrainment of liquid prior to discharge at stack 30.

A separated aqueous slurry phase collects in the lower conical portion 48 of the scrubber. This occurs since the density of wetted flyash is much greater than flue gas and initial separation occurs as the flow direction of the gas reverses to pass upwardly through the mist separator element 38. The slurry is recycled via pump 16 through line 20 to tangential injection nozzles 36. Typically, substantial quantities of flyash or solids are retained in the slurry in the range of approximately 5-25% by weight to provide nuclei for sulfate and sulfite precipitation as will be explained, although solids concentrations up to 40 or 50% are acceptable. Lime or other reactant is introduced into the scrubber in sufficient quantity to maintain the liquid slurry in the scrubber unit at near neutral conditions. Flyash in the combustion gases is entrapped in the liquid droplets and remains in the slurry. Sulfur dioxide in the combustion gases is chemically absorbed and remains in the slurry as calcium sulfite and calcium sulfate. A controlled quantity of slurry is discharged across line 50 into thickener 22 to maintain the desired solids concentration.

Thickener 22 can be any conventional type of settling apparatus for separating the solid portions from the liquid and is shown as a circular vessel having a hopper bottom and employing a rotating rake mechanism. The settled solids are removed at discharge line 26 by pump 52 to disposal area 55 such as an ash pond. Thickener 22 includes an annular weir 54 from which water is removed and returned to the system via line 24 and pump 57. The mechanism which takes place in the present process resulting in successful particulate and sulfur dioxide removal is believed to involve flyash solids in the slurry which aid in the precipitation of calcium sulfite and calcium sulfate crystals by providing heterogeneous nucleation sites. By maintaining a high proportion of flyash solids in the recycle stream, the number of nucleation sites is increased.

FIG. 6 is an electron micrograph enlarged 10,000 times showing the formation of sulfite and sulfate crystals on flyash as a nucleation site. The coprecipitation of sulfates and sulfites on the flyash yields several important advantages. The flyash, as pointed out above, provides a nucleation site. Further, flyash is generally recognized as being a highly abrasive substance which can substantially damage equipment, particularly piping, which is often lined with substances such as rubber. The formation of crystals on the surface of the flyash provides an insulating layer protecting equipment from the abrasive characteristics of flyash. Further, the sulfite crystals have a natural lubricating characteristic to further reduce the possibility of damage to equipment from flyash. This appears to be contradictory to prior art work which concluded that little or no precipitation occurred on flyash and that flyash was substantially inert.

Figure 3:
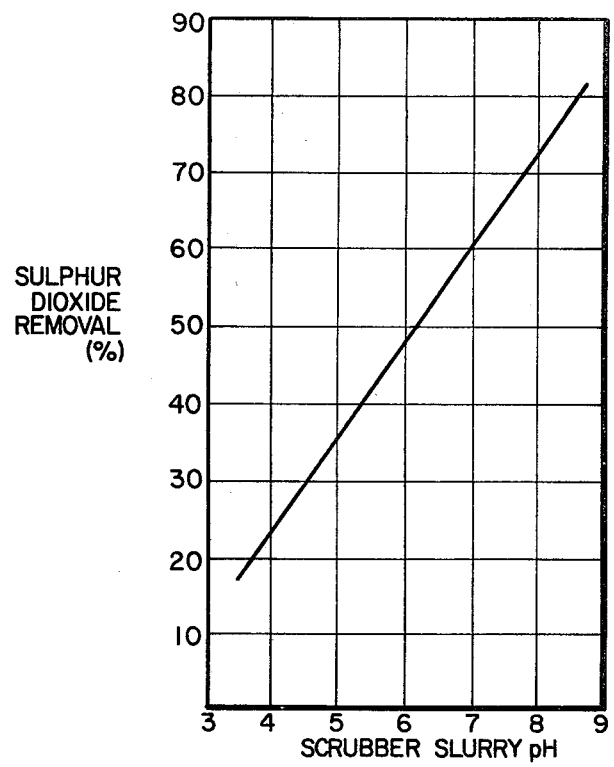
FIG. 3 is a graph illustrating the effect of pH on $SO_2$ removal with reactants containing calcium and magnesium.

FIG. 3 is a graphical representation showing the effect of pH on $SO_2$ removal using high calcium lime. As shown in FIG. 3, the percent of $SO_2$ removal for high calcium lime increased from approximately 20 to 80% between the ranges of pH 3.6 and pH 8.1. Data indicated a linear relationship between pH and $SO_2$ removal in the range tested. Similar results have been obtained using magnesium with concentrations of approximately 2300 ppm to 3600 ppm concentration with the percent of $SO_2$ removal increasing from approximately 40 to 90% between the ranges of pH 3.6 and pH 8.1.

FIG. 4 graphically shows that the relative saturation of calcium sulfate increased with pH up to approximately 4.5 to 5.5. Above pH 5, the relative saturation level decreased with pH, becoming subsaturated at pH 6.5 and reaching 0.2 of saturation at pH 8. As shown in FIG. 5, the corresponding relative saturation of calcium sulfite increases with pH to a value of 10 at pH 5.5 resulting in a large driving force for calcium sulfite precipitation.

EXAMPLE

Figure 2:
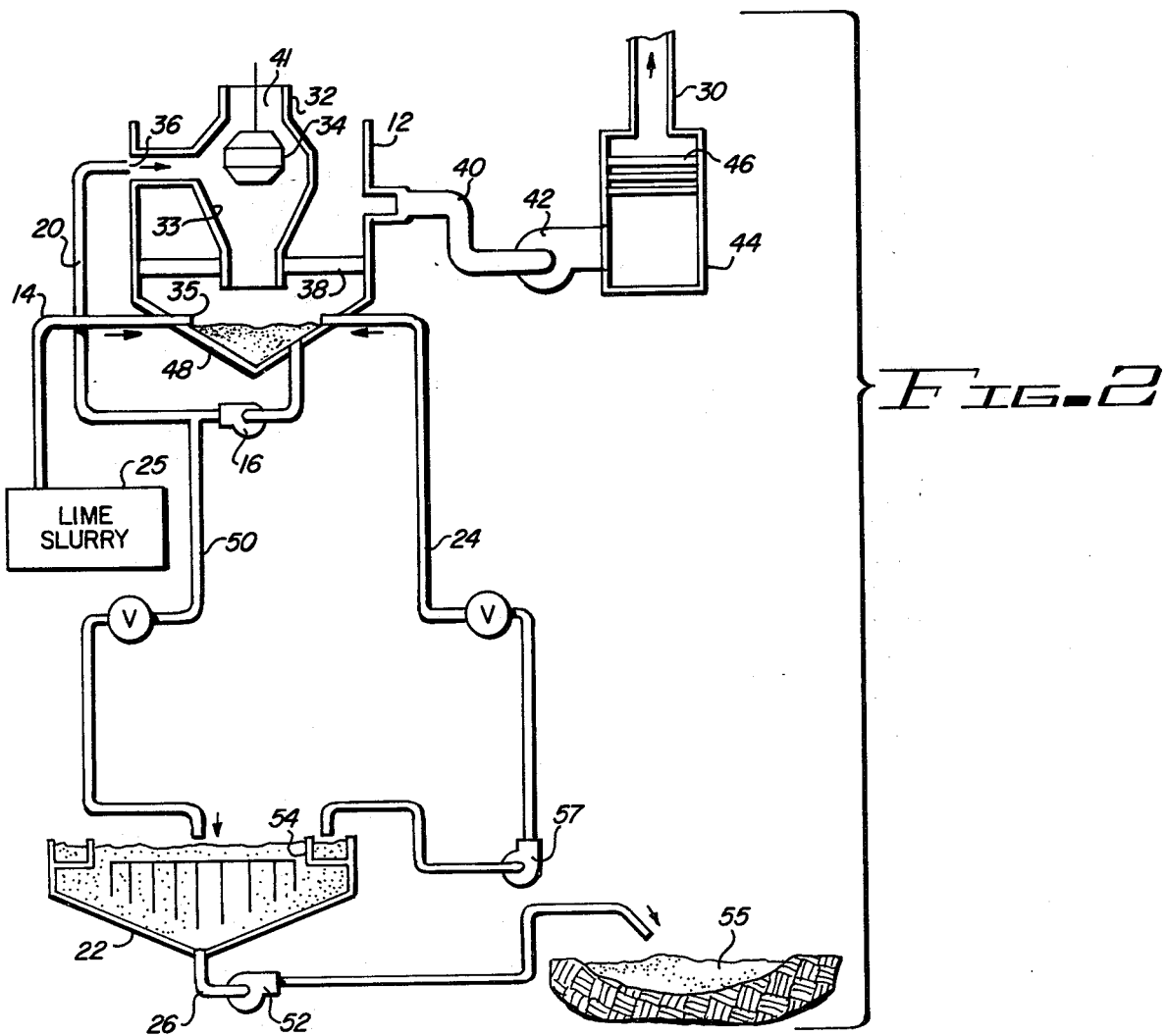
FIG. 2 is a schematic flow diagram illustrating the process of the present invention.

In order to test the effectiveness of the present program, Arizona Public Service Company, as a continuation of an emission control development program, instituted testing to evaluate $SO_2$ removal capability of vertical wet scrubbers at the Four Corners Power Plant located on the Navajo Indian Reservation near Farmington, New Mexico. The power plant consists of five units, having a total plant capacity of 2,175 MW. The plant consumes an average of 19,000 tons of coal each day or about 7 million tons annually. A wet scrubber of the type manufactured by Chemical Construction Company was isolated from the scrubbing system and the process as depicted in FIGS. 1 and 2 was utilized to treat the flue gas from one of the generating units. Flue gas from a coal burning boiler at a temperature of from 340° F. and a flow rate of 407,000 cubic feet per minute and containing approximately 800 ppm of sulfur dioxide and 6 grains per cubic foot of flyash was passed through the scrubber.

An aqueous lime solution containing solid flyash and sulfur precipitates was recycled through the scrubber with a portion of the 10,000 GPM stream bled-off to maintain a solids concentration of approximately 5 to 25% by weight although solids concentrations up to about 40 to 50% are acceptable. At higher solids concentrations, the mechanical thickener may be entirely eliminated effecting substantial equipment savings. The bleed stream was directed to a thickener where solids were concentrated for discharge to disposal facilities and the clarified overflow was returned to the scrubber. The liquid to gas ratio, gallons of liquid per 1,000 actual cubic feet of gas, was approximately 25. Temperature of the clean exit combustion gases was approximately 110° F. The pressure drop across the venturi varied between approximately 20 to 10 in. of $H_2O$ with negligible effect on particulate removal. The flyash had the following typical chemical analysis:

| | |
|---|---|
| $SiO_2$ | 53.4 |
| $Al_2O_3$ | 26.4 |
| $Fe_2O_3$ | 8.6 |
| $TiO_2$ | 0.6 |
| $P_2O_5$ | 0.8 |
| $CaO$ | 4.0 |
| $MgO$ | 1.0 |
| $Na_2O$ | 1.4 |
| $K_2O$ | 0.7 |
| $SO_3$ | 2.3 |
| | 99.2 |

The high calcium quicklime had the following typical analysis:

| | |
|---|---|
| Acid insol | .8 |
| Iron Oxide ($Fe_2O_3$) | .07 |
| Aluminum Oxide ($Al_2O_3$) | .2 |
| Calcium Carbonate ($CaCO_3$) | 2.0 |
| Calcium Oxide (CaO) | 94.0 |
| Magnesium Oxide (MgO) | .5 |
| Calcium Hydroxide ($CaOH_2$) | 2.0 |

Lime utilizations were slightly above 100% at the lower pH range indicating that the flyash provides some alkalinity in the system. The lime solution was added directly into the scrubber immediately above the slurry liquid level. The quantity of lime slurry was controlled to maintain the desired $SO_2$ removal.

Test data and results of sulfur dioxide removals and relative saturation of the liquids are shown in Table I:

TABLE I.

| Test No. | Particulate Removal (%) | Slurry Recycle pH | Slurry Solids (%) | Inlet $SO_2$ (ppm) | $SO_2$ Removal (%) | $Mg^{++}$ Concentration (ppm) | Slurry Recycle Relative Saturations | | Slurry Solids (%) Oxidation | Lime Utilization (%) |
|---|---|---|---|---|---|---|---|---|---|---|
| | | | | | | | $CaSO_3 \cdot \tfrac{1}{2}H_2O$ | $CaSO_4 \cdot 2H_2O$ | | |
| 1 | 99.6 | 5.9 | 8.2 | 700 | 43 | 25 | 13.7 | 1.75 | 57 | 154 |
| 2 | 99.6 | 5.6 | 7.4 | 810 | 43 | 25 | 6.9 | 2.31 | | 122 |
| 3 | 99.6 | 5.6 | 8.0 | | | 25 | 8.0 | 1.77 | | 3 |
| 4 | 99.6 | 5.9 | 10.8 | 700 | 47 | 35 | 10.8 | 1.68 | 30 | 8 |
| 6 | 99.6 | 6.2 | 8.5 | | | 35 | 8.1 | 1.22 | | |
| 6 | 99.6 | 5.7 | 10.5 | 690 | 33 | 30 | 10.6 | 1.92 | | 99 |
| 7 | 99.6 | 5.8 | 9.7 | 680 | 34 | 45 | 8.9 | 1.66 | 39 | 101 |
| 8 | 99.6 | 5.8 | — | 650 | 52 | 30 | 4.7 | 1.60 | | 181 |
| 9 | 99.6 | 6.0 | 11.2 | | | 55 | 8.8 | 1.26 | 6 | 99 |
| 10 | 99.6 | 7.0 | 9.7 | 570 | 63 | 70 | 6.8 | 0.83 | 11 | 127 |
| 11 | 99.6 | 7.0 | — | | | 70 | 4.6 | 0.66 | | |
| 12 | 99.6 | 7.0 | 14.0 | 660 | 68 | 80 | 5.2 | 0.57 | | 123 |
| 13 | 99.6 | 7.0 | — | | | 85 | 5.3 | 0.58 | | |
| 14 | 99.6 | 8.3 | 10.0 | 710 | 80 | 85 | 2.3 | 0.33 | | |
| 15 | 99.6 | 8.0 | 9.0 | 570 | 82 | 85 | 3.8 | 0.35 | 10 | |
| 16 | 99.6 | 7.8 | 6.8 | 630 | 71 | 55 | 4.6 | 0.40 | 20 | 78 |
| 17 | 99.6 | 8.0 | 7.1 | | | 50 | 4.1 | 0.25 | 7 | |
| 18 | 99.6 | 8.2 | 9.3 | 690 | 74 | 55 | 3.7 | 0.22 | 4 | 69 |
| 19 | 99.6 | 8.0 | 7.5 | | | 65 | 3.5 | 0.25 | 4 | |
| 20 | 99.6 | 8.0 | 10.0 | 690 | 74 | 80 | 3.9 | 0.23 | 5 | |
| 21 | 99.6 | 7.4 | 12.3 | | | 120 | 5.4 | 0.84 | 8 | |
| 22 | 99.6 | 7.4 | 10.3 | | | 105 | 5.2 | 0.73 | 22 | |
| 23 | 99.6 | 7.3 | 10.9 | | | 105 | 4.8 | 0.46 | 12 | |
| 24 | 99.6 | 7.5 | 15.0 | | | 110 | 3.9 | 0.26 | 11 | |
| 25 | 99.6 | 6.2 | 18.0 | 370 | 64 | 135 | 8.6 | 0.55 | 13 | |
| 26 | 99.6 | 7.3 | 15.0 | 710 | 63 | 165 | 8.0 | 0.35 | 13 | |
| 27 | 99.6 | 7.0 | 19.3 | 750 | 61 | 75 | 3.8 | 0.29 | 8 | 60 |
| 28 | 99.6 | 7.4 | 11.1 | 880 | 64 | 95 | 3.3 | 0.54 | 14 | |
| 29 | 99.6 | 7.4 | 12.1 | | | 30 | 3.8 | 0.28 | 23** | |
| 30 | 99.6 | 7.6 | 16.8 | 830 | 57 | 85 | 5.6 | 0.32 | 27** | |
| 31 | 99.6 | 7.4 | 17.0 | 680 | 57 | 125 | 2.5 | 0.67 | | |

During this period of operation, the thickener was not operating correctly. Solids were being returned to the scrubber from the thickener overflow.

Table II shows tests results utilizing an aqueous solution of high magnesium lime as the reactant in the system. The process was as described above with aqueous lime injected directly into the scrubber circuit.

TABLE II

| Test No. | Particulate Removal (%) | Slurry Recycle pH | Slurry Solids (%) | Inlet $SO_2$ (ppm) | $SO_2$ Removal (%) | $Mg^{++}$ Concentration (ppm) | Slurry Recycle Relative Saturations | | Slurry Solids (%) Oxidation | Lime Utilization (%) |
|---|---|---|---|---|---|---|---|---|---|---|
| | | | | | | | $CaSO_3 \cdot \tfrac{1}{2}H_2O$ | $CaSO_4 \cdot 2H_2O$ | | |
| 1 | 99.6 | 5.7 | 10.8 | 870 | 75 | 3850 | 16.4 | 1.25 | 33 | — |
| 2 | 99.6 | 5.9 | 10.3 | 850 | 73 | 3600 | 14.4 | 1.27 | 29 | — |
| 3 | 99.6 | 6.1 | 9.5 | 870 | 57 | 2300 | 7.0 | 0.98 | 11 | — |
| 4 | 99.6 | 7.2 | 10.5 | 910 | 70 | 2650 | 5.0 | 0.06 | 10 | — |
| 5 | 99.6 | 7.2 | 9.5 | 850 | 70 | 2150 | 7.0 | 0.10 | 5 | — |
| 6 | 99.6 | 8.1 | 14.6 | 920 | 92 | 2450 | 6.7 | 0.36 | 15 | — |
| 7 | 99.6 | 8.2 | 13.6 | | | 2250 | 6.4 | 0.34 | 20 | — |
| 8 | 99.6 | 5.0 | 15.1 | 840 | 41 | 3300 | 2.8 | 1.65 | 85 | — |

The tests conducted over a substantial period of time yielded essentially scale-free operation. From the foregoing, it will be observed that particulate removal was measured in excess of 99.6% and sulfur dioxide removal in the range of approximately 60 to 82%. A significant result was the determination that the relative saturation of $CaSO_4 \cdot 2H_2O$, gypsum, in the scrubber liquid is a function of $SO_2$ removal. At low removal rates the recycle liquor is supersaturated with respect to gypsum and thus has a potential to form a hard chemical scale. As the removal rate approached 60% to 70%, the gypsum relative saturation decreased and the liquor became subsaturated, thus substantially eliminating the possibility of gypsum scaling. This lowering of the relative saturation is believed to be a direct result of the lower oxidation rates and the co-precipitation of calcium sulfate and calcium sulfite.

Total test particulate removal was measured using EPA Method 5 and fine particulate was measured using a modified Anderson technique. Other methods of measuring particulates may yield slightly different results. Thus, the present invention provides an effective process for treating flue gases with lime for the removal of particulate material and sulfur dioxide using an appropriate reactant in a single stage wet scrubber maintaining the scrubber at a subsaturated level of calcium sulfate. Other forms of lime such as dolomite may also be used. High levels of $SO_2$ removal are achievable both with high calcium lime and with magnesium lime while maintaining high particulate removal. Calcium sulfate concentrations decreased well below saturation as $SO_2$ removal increased allowing essentially a scale-free operating system. Results achieved with this process enables improvement in the efficiency of scrubbing units, reduction of objectionable emissions, and, reduced scrubber maintenance and boiler down time.

Existing scrubber systems can be adapted to incorporate the process of the present invention with minimum modification required. Both vertical and horizontal scrubbers, as for example scrubbers of the Weir type, can be utilized. An important advantage is the elimination of mix or reaction tanks generally necessary with conventional systems as reactions fully take place in the slurry system with a residence time in the slurry recycle system of approximately 10 to 60 minutes. Other equipment savings are obtainable due to the relatively low liquid to gas ratio which reduces system pump requirements.

It will be obvious to those skilled in the art to make various changes, alterations and modifications to the process described herein. To the extent the changes, alterations and modifications do not depart from the spirit and scope of the dependent claims, they are intended to be encompassed therein.

We claim:

1. A process for the removal of $SO_2$ from a combustion gas stream containing particulate solids including flyash in a wet scrubber having an aqueous slurry-containing sump zone, the steps comprising:
   (a) passing said gas stream through the wet scrubber to effect $SO_2$ removal;
   (b) separately and directly injecting a calcium containing reactant into said scrubber to mix with the aqueous slurry in the sump to form, inter alia, calcium sulfite and calcium sulfate, said slurry having a pH maintained in the range of approximately 6.0 to 8.5;
   (c) discharging at least a portion of said slurry from said scrubber;
   (d) bleeding off a portion of said discharged slurry to maintain a controlled quantity of slurry having a solids content of approximately 5 to 40% by weight of which at least approximately 5 to 25% comprises flyash;
   (e) recycling said flyash containing controlled quantity of slurry to said scrubber and contacting said controlled quantity of slurry with said aqueous slurry to provide nucleation sites for the formation of calcium sulfite and calcium sulfate crystals;
   (f) co-precipitating calcium sulfite and calcium sulfite crystals on said flyash thereby maintaining a substantially unsaturated calcium sulfate level in said aqueous slurry minimizing scale deposition on the scrubber surfaces.

2. The process of claim 1 wherein the pH is controlled by addition of said calcium containing reactant which is an aqueous lime solution.

3. The process of claim 1 wherein the pH is controlled by addition of said calcium containing reactant which includes magnesium oxide.

4. The process of claim 1 wherein the residence time of the slurry in the scrubber recycle system is approximately 10 to 60 minutes.

5. The process of claim 1 wherein the portion of discharged slurry removed is approximately 1% to 5% of the total volume.

6. The process of claim 1 wherein the liquid (gallons) to gas (1000 actual cubic feet) ratio in the scrubber is maintained at approximately 25 to 1.

7. The process of claim 1 wherein said bleed-off portion of said discharged slurry is subjected to thickening and returning clarified liquid substantially unsaturated with respect to calcium sulfate to the scrubber for re-use in an essentially closed loop system.

8. The process of claim 1 wherein said reactant is introduced into the sump zone of the scrubber.

* * * * *

UNITED STATES PATENT AND TRADEMARK OFFICE
CERTIFICATE OF CORRECTION

PATENT NO. : 4,150,096

DATED : April 17, 1979

INVENTOR(S) : William M. Nelms and Charles F. Turton

It is certified that error appears in the above-identified patent and that said Letters Patent are hereby corrected as shown below:

On Page 1, [76], the correct zip code of the co-inventor, Charles F. Turton, should be --85016--.

Column 1, line 59, the word "state" should be changed to read --stage--.

Column 8, line 23, Claim 1, should read --(f) co-precipitating calcium sulfite and calcium sulfate.--

Signed and Sealed this

Eleventh Day of September 1979

[SEAL]

Attest:

LUTRELLE F. PARKER

Attesting Officer

Acting Commissioner of Patents and Trademarks